3,060,011
MANUFACTURE OF CALCIUM CYANAMIDE-CALCIUM NITRATE MIXTURES
Franz Kaess, Traunstein, and Thomas Fischer, Trostberg, Germany, assignors to Suddeutsche Kalkstickstoff-Werke Aktiengesellschaft, Trostberg, Germany
Filed Jan. 6, 1961, Ser. No. 81,077
Claims priority, application Germany Jan. 7, 1960
1 Claim. (Cl. 71—56)

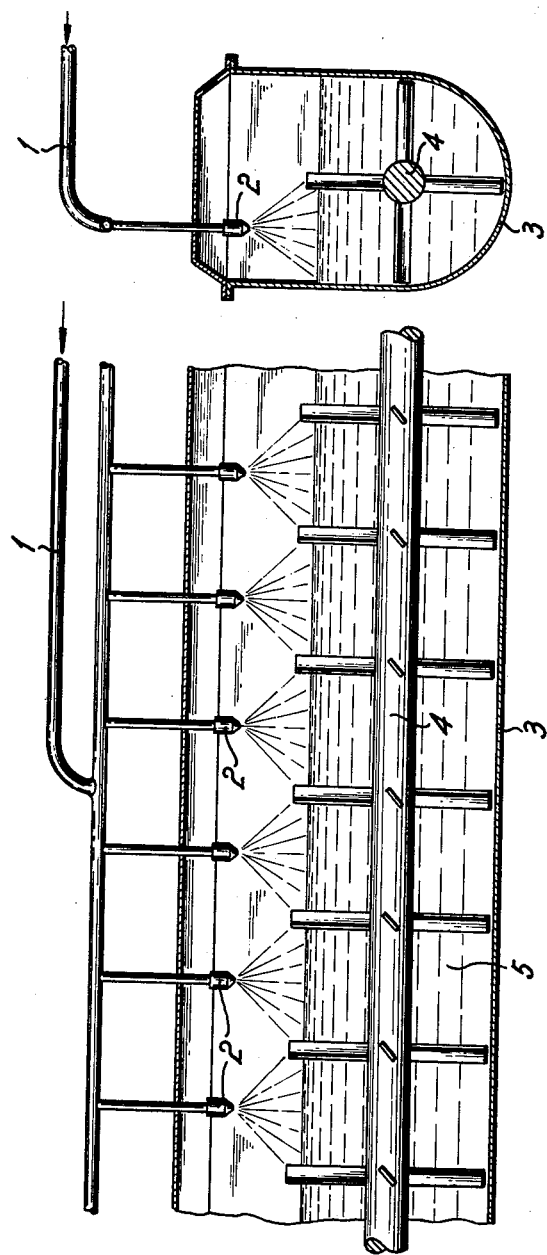

The invention relates to fertilizer mixtures containing calcium cyanamide and calcium nitrate.

It is well known that it is difficult to crystallize and store calcium nitrate which is free of ammonium nitrate. In order to effect a good crystallization of such calcium nitrate, it is necessary to evaporate a melt to a minimum concentration which is already difficult enough; in addition, precise conditions have to be maintained during the crystallization such as supercooling of the melt, maintaining a certain proportion of crystal nuclei, providing cold cooling water, if necessary even cooling brine.

Said difficulties could be overcome by an addition of a certain percentage of ammonium nitrate.

However, for mixtures of calcium cyanamide and calcium nitrate it is generally not possible to use a calcium nitrate which contains ammonium nitrate because the free lime contained in the calcium cyanamide reacts with such ammonium nitrate with formation of free ammonia, which results in losses and inconveniences.

Therefore, in the manufacture of calcium cyanamide-calcium nitrate mixtures, a procedure had been adopted to mix powdery calcium cyanamide or calcium cyanamide flour into a calcium nitrate melt. But in such procedure, caking takes place and the product adheres to the walls of the containers, which interferes with a continuous operation. In addition, crystalline calcium nitrate was used, which involved the difficulties recited hereinabove and required additional heat supply to heat the mixture to fusion temperature.

It is a principal object of the invention to provide a method which avoids the difficulties and cost of the conventional mixing procedures of calcium cyanamide and calcium nitrate.

Other objects and advantages will be apparent from a consideration of the specification and claim.

We have found calcium cyanamide can be readily mixed with calcium nitrate which is free of ammonium nitrate by spraying molten calcium nitrate upon moving powdery calcium cyanamide having a temperature below the melting point of the calcium nitrate. Preferably, the temperature of the calcium cyanamide is preferably kept at a temperature about 20 to 50° C. below the temperature of the melt.

An apparatus suitable for carrying out the invention is shown, by way of example, in the accompanying drawings, in which FIG. 1 is a longitudinal section, and
FIG. 2 a cross-sectional view of a mixing device.

In the drawings, the reference numeral 3 designates a vessel 3 in which ground calcium cyanamide 5 is continuously advanced and rotated through paddles carried by an axial shaft 4. Molten calcium nitrate is fed through line 1 and sprayed on the rotating calcium cyanamide through nozzles 2.

Due to the continuous movement of the calcium cyanamide, the calcium nitrate is always sprayed on different calcium cyanamide particles. The molten nitrate is preferably concentrated to a content of about 75 to 88% $Ca(NO_3)_2$.

Our method ensures a continuous and undisturbed operation and makes use of the fact that on admixture of calcium cyanamide to molten calcium nitrate mixed crystals are formed which have a considerably higher melting point than pure calcium nitrate. As a further advantage, the heat of fusion is carried off by heating the ground calcium cyanamide.

Conventional comminuting machinery may be used to homogenize the mixture, and the mixture may be cooled to the desired storage or bagging temperature.

Our method is suitable to prepare mixtures containing about 1 to 6 percent of nitrate N. By avoiding the crystallization and storage difficulties of the ammonium nitrate free calcium nitrate, the method is more economic and practical than the procedures used heretofore.

The following examples are given to illustrate the invention.

*Example 1*

40 long tons per hour of ground calcium cyanamide having a temperature of 25° C. were continuously passed through a mixing device of the type shown in the drawings, which had a length of 15 m. and a diameter of 700 mm. 6 long tons per hour of calcium nitrate melt (85% $Ca(NO_3)_2$) of a temperature of 58° C. were fed into the mixer through 6 spray nozzles distributed over a length of 6 m. and operated with compressed air.

The produced mixture remained powdery. For complete homogenization, it was passed through a hammer mill.

The heat of the melt and the developed heat of crystallization adjusted the temperature of the mixture to 38° C. The mixture was then cooled in a subsequent cooler to 28° C.

The obtained product contained 1.9% nitrate N.

*Example 2*

The apparatus described in Example 1 was charged with 40 long tons per hour of calcium cyanamide of 20° C. and 13 long tons of an 85% $Ca(NO_3)_2$ melt of 53° C. The mixing temperature adjusted itself to about 39° C. The obtained product contained about 3.5% nitrate N.

We claim:

A method for preparing a mixture of calcium cyanamide and calcium nitrate comprising passing powdery calcium cyanamide through a mixing zone and spraying molten calcium nitrate having a $Ca(NO_3)_2$ content of about 75 to 85 percent on the moving calcium cyanamide powder, said calcium cyanamide having a temperature about 20 to 50° C. below the temperature of said molten calcium nitrate.

References Cited in the file of this patent
UNITED STATES PATENTS

| | | |
|---|---|---|
| 1,908,978 | Hamprecht | May 16, 1933 |
| 1,989,684 | Cox | Feb. 5, 1935 |

FOREIGN PATENTS

| | | |
|---|---|---|
| 502,740 | Canada | May 18, 1954 |